May 26, 1959 — D. R. TANGUY — 2,888,309
MEMORIZING SYSTEM
Filed Oct. 7, 1955
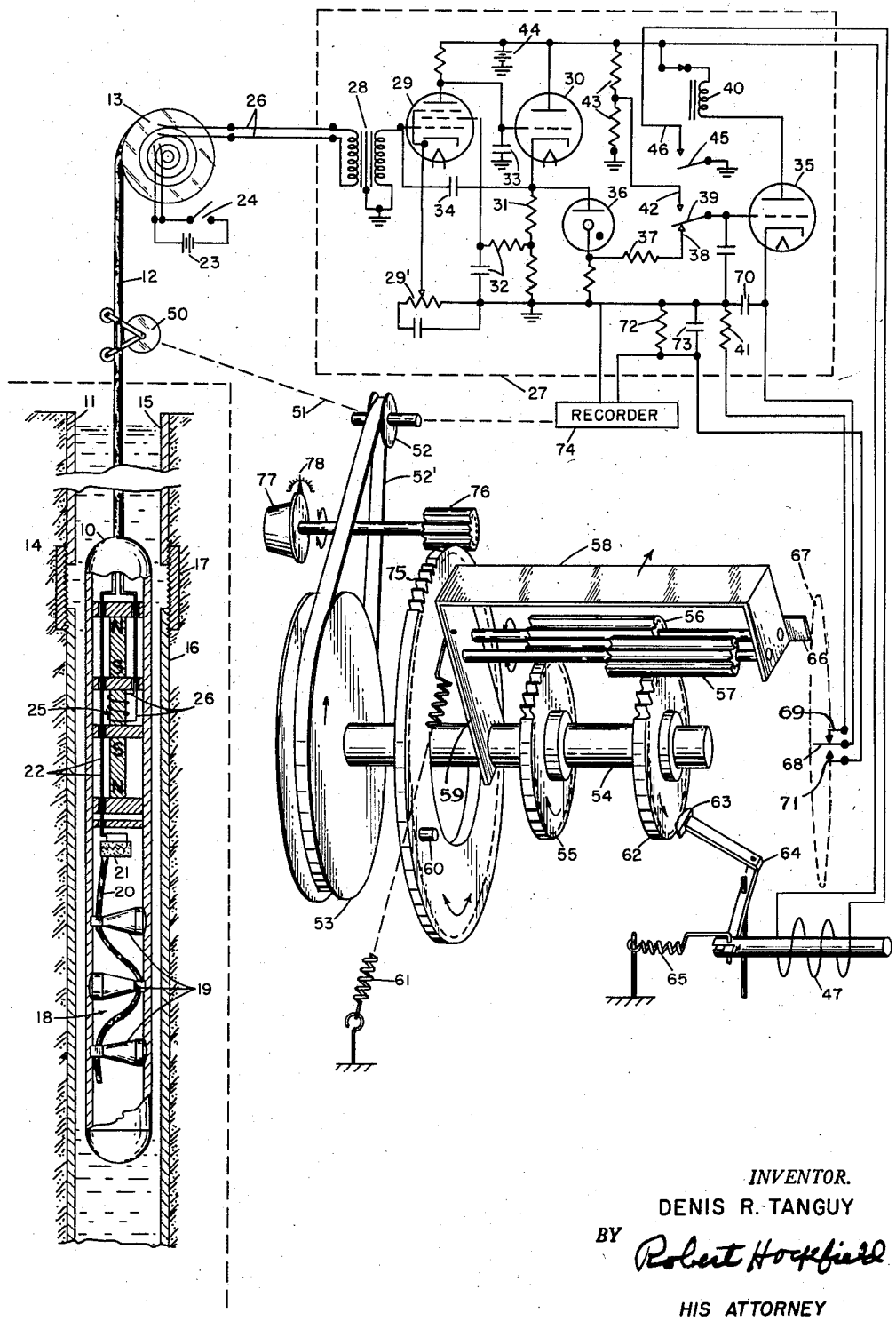
INVENTOR.
DENIS R. TANGUY
BY Robert Hochfield
HIS ATTORNEY

United States Patent Office 2,888,309
Patented May 26, 1959

2,888,309
MEMORIZING SYSTEM

Denis R. Tanguy, Houston, Tex., assignor, by mesne assignments, to Schlumberger Well Surveying Corporation, Houston, Tex., a corporation of Texas Application October 7, 1955, Serial No. 539,153

7 Claims. (Cl. 346—33)

This invention relates to memorizing systems and, more particularly, pertains to a memorizing system for utilizing a pulse produced by an instrument representing the occurrence of a given event as the instrument transverse a borehole drilled into the earth.

In certain operations in which an instrument is lowered into a borehole, it is often desirable to refer the occurrence of an event at some depth in the borehole to a different depth. For example, a casing perforator may be lowered on a cable whose length may be measured as an indication of the depth of the perforator and the borehole instrument may be further provided with a casing collar locator for determining the joints between adjacent sections of the casing as an aid to accurate depth determinations. However, in practice, the casing collar locator is physically spaced from the perforator portion of the borehole apparatus and thus the casing collar indications are not accurately representative of the passing of the perforator portion relative to a casing joint.

To overcome this difficulty, various memory devices have been proposed. For example, in one case a magnetic tape is driven in synchronism with movement of the borehole instrument and recordings of the events to be memorized are made on the tape. At a distance along the tape corresponding to the desired depth shift, there is disposed a pick up head for deriving a signal having the desired depth correlation. Obviously, such memory devices are often complex in their construction and sometimes unreliable in operation.

Therefore, it is an object of the present invention to provide a new and improved memorizing system for utilizing pulses produced by an instrument adapted to traverse a borehole which is simple to construct and reliable in operation.

Another object of the present invention is to provide a new and improved memorizing system featuring a short reset time between the end of a memorizing cycle and the beginning of a new cycle.

A further object of the present invention is to provide a new and improved mechanical memorizing system requiring no moving electrical connections.

A memorizing system embodying the present invention may utilize an electrical pulse produced by an instrument representing the occurrence of a given event as the instrument traverses a borehole drilled into the earth. The system comprises a member movable from a quiescent position along a given path, driving means for moving the member along the given path in proportion to movement of the instrument through the borehole, and a clutch for mechanically coupling the member and the driving means. The clutch is selectively operable in response to a pulse from the instrument to complete a driving connection whereby the movable member is displaced along the given path. Disposed at a point along the given path is a device for deriving an electrical pulse in response to engagement by the movable member. The latter pulse is spaced in time from the first-mentioned pulse by an amount dependent upon the speed of movement of the instrument and the distance along the given path between the aforesaid quiescent position and the aforesaid point.

The novel features of the present invention are set forth with particularity in the appended claims. The present invention, both as to its organization and manner of operation, together with further objects and advantages thereof, may best be understood by reference to the following description taken in connection with the accompanying drawing in which the single figure is a schematic diagram, portions of which are shown in perspective view, of a memorizing system embodying the present invention.

Although the invention may be used in any of a variety of applications wherein it is desirable to memorize an impulse with respect to the motion of any device attached to the end of a cable passing into a borehole, it will be described in the particular environment of an arrangement including a gun perforator and casing collar locator unit disposed in a borehole extending into the earth.

Thus, as shown in the drawing, a fluid-tight housing 10 is supported in a borehole 11 by an armored cable 12 which together with a winch 13 may be employed for lowering and raising housing 10 in the borehole. Borehole 11 traverses a plurality of earth formations 14 and may be provided with a casing including a string of sections, such as sections 15 and 16 joined together by a threaded coupling 17.

Housing 10 includes a lower, casing-perforator section 18 which may include any conventional type of perforating units, such as shaped charges 19, as illustrated. The charges 19 may be fired by means of a primacord 20, in turn, ignited by a blasting cap 21 to which leads 22 are connected. The leads 22 extend through housing 10 and cable 12, and a circuit to a battery 23 at the surface of the earth may be selectively completed by means of an operating switch 24.

The length of cable 12 may be measured in the usual manner such as by coupling a measuring wheel, such as a measuring wheel 50 to be discused hereinafter, to the cable in order to position housing 10 at a selected depth in borehole 11. Additional accuracy in positioning housing 10 is often desirable so that perforator units 19 may be fired when housing section 18 is precisely located at the desired depth. To this end, there is also provided a casing collar locator unit 25 at the upper end of housing 10. Any well-known construction may be employed; for example, the casing collar locator may be of the type disclosed in Patent 2,558,427, as shown. A magnetic circuit is provided in the casing collar locator 25 so that when it passes opposite one of the casing joints, such as the one designated 17, a pulse appears at a pair of leads 26 which extend through cable 12 to the surface of the earth. Accordingly, a record of the number of joints which are passed by the casing collar locator 25 may be obtained as a function of depth, in a known manner.

As seen in the drawing, casing collar locator 25 is physically spaced from perforator unit 18 relative to the axis of the borehole and thus the indications of the casing joints are not precisely representative of the position of the perforator 18. To accommodate this depth discrepancy, there is provided a memorizing system embodying the present invention.

In order to bring the pulses from casing collar locator 25 to a suitable amplitude level, there is provided an amplifier 27 having a step-up input transformer 28. Preferably, transformer 28 has good low-frequency characteristics and is well shielded. Its primary winding is connected to leads 26 and its secondary winding is coupled to the control grid-cathode circuit of a pentode type electron tube 29. The circuit for tube 29 is arranged in a known manner so that it functions as a "starved" pentode amplifier. Its cathode circuit is provided with an adjustable bias resistor 29' and its output is applied to a triode 30 connected as a cathode follower. If desired, D-C stabilization may be achieved by connecting the screen grid of pentode 29 to a point of the cathode resistor 31 of cathode follower 30 and providing appropriate filtering of the resulting feed-back signal, such as by the use of an R-C filter 32. A by-pass condenser 33 in the grid circuit of cathode follower 30 provides further high frequency attenuation to minimize spurious response. Additional negative feedback is applied from the cathode of tube 30 to the control grid of tube 29 via a coupling condenser 34. The capacitance value of condenser 34 is selected to provide attenuation of high frequency spurious signals; however its value is such that the feed-back becomes moderately positive at the operating frequency of the amplifier 27. Therefore, the effective gain of the amplifier in its operating range is increased.

When a signal of sufficient amplitude appears at the cathode of tube 30, it is conveyed to the control grid of a triode 35 through a coupling device in the form of a gaseous discharge tube 36, a resistor 37 and normally closed contacts 38, 39 of a relay whose actuating coil 40 is in the anode circuit of triode 35. It will be noted that triode 35 has a very small anode-cathode current in its quiescent state, well below the current needed to actuate relay coil 40. A cathode resistor 41 is provided for tube 35 to develop a sufficient bias to assure that this condition prevails.

Upon the application of a signal pulse to the control grid of tube 35, enough anode-cathode current flows through tube 35 to energize relay coil 40 and movable relay contact 39 is carried into engagement with a fixed contact 42 connected to a voltage divider 43 that is shunted across a source of positive potential, such as a battery 44. Thus although the signal pulse may terminate, tube 35 is biased to remain in a conductive condition. At the same time, the energization of relay coil 40 closes normally open relay contacts 45 and 46 thereby to connect battery 44 to the coil of a solenoid 47. Solenoid 47, when energized, engages a clutch which will be described hereinafter.

Mechanically coupled to cable 12 is a measuring wheel 50 arranged so that its rotation is representative of movement of the cable. Wheel 50 is mechanically coupled in any appropriate manner, represented schematically by dash line 51, to a pulley 52 which, in turn, is coupled by a belt 52', for example, to a wheel 53 that is fixed to a shaft 54. It is thus evident that wheel 53 and shaft 54 rotate in proportion to movement of instrument 10 through borehole 11.

Mechanically fixed to shaft 54 is a gear 55 of a planetary system which further comprises a pinion 56 that is in meshing engagement with gear 55 and with another pinion 57. The pinions 56 and 57 are rotatably supported on a carriage 58 having an arm 59 rotatably secured to shaft 54. Thus, the carriage 58 is rotatable about the axis of shaft 54 from a quiescent position where arm 59 is held in engagement with a stop pin 60 by a tension spring 61. To effect such rotation, a gear 62 rotatably supported relative to shaft 54 is in meshing engagement with pinion 57, and a brake shoe 63 is positioned adjacent one surface of gear 62. The shoe 63 is carried by a linkage 64 connected to a tension spring 65 which normally holds the shoe away from the surface of gear 62. However, the core of solenoid 47 is connected to the linkage to act in opposition to this spring.

Prior to the initiation of a memorizing cycle, arm 59 engages stop 60 and gears 55 and 62 rotate in opposite directions, but at the same speed. Whenever solenoid 47 is energized brake shoe 63 engages gear 62 and stops it. This, of course, causes gears 56 and 57 to displace carriage 58 against the bias of spring 61 so that a projection 66 of the carriage traverses a circular path 67 about the axis of shaft 54.

This motion of carriage 58 continues until projection 66 engages a movable switch arm 68 that is normally in engagement with a fixed contact 69. These contacts are in the cathode circuit of tube 35 so that anode-cathode current in this tube is interrupted and relay coil 40 is de-energized. Various components in amplifier 27 thus return to their quiescent conditions and solenoid 47 is de-energized.

A capacitor 70, in the cathode circuit of tube 35, however, delays the reduction in anode-cathode current just long enough for switch arm 68 to be carried into engagement with a fixed contact 71 and the charge of this condenser is applied to a network including a resistor 72 in parallel with a condenser 73.

Connected to network 72, 73 is a recorder 74 in which, for example, the recording medium is displaced in proportion to movement of housing 10 through the borehole 11. Thus, an electrical pulse developed by connecting condenser 70 to network 72, 73 is supplied to and recorded by recorder 74 at a time dependent upon the speed of movement of housing 10 and the distance between the quiescent position of carriage 58 and the position of switch device 68, 71 along path 67.

Resistor 72 has a resistance value so large that it will not permit a sufficient current to flow in tube 35 to maintain relay coil 40 energized. Accordingly, contacts 45, 46 open and solenoid 47 is de-energized. Spring 65 carries shoe 63 from engagement with gear 62 and spring 61 returns the carriage to its quiescent position.

To adjust the amount of depth shift afforded by the memorizing system embodying the present invention, stop 60 is mounted to the face of a large gear 75 which is in meshing engagement with a pinion 76. The pinion is coupled to a manual control knob 77 positioned to move relative to a scale 78. Appropriate means is provided, such as a suitable braking device, so the gear 75 is immovable, except under the action of knob 77. The scale 78 may be calibrated directly in units of depth and knob 77 may be manipulated to adjust the initial or quiescent position of carriage 58 with respect to switch arm 68.

Reviewing briefly the operation of the memorizing system just described, it will be observed that as winch 13 draws cable 12 and housing 10 upwardly, measuring wheel 50 produces rotation of driving means 53, 54 in proportion to movement of the housing through borehole 11. Normally, relay coil 40 in amplifier 27 is de-energized and carriage 58 is held by spring 61 at a position in which arm 59 engages the stop pin 60 determining a quiescent position for carriage extension 66. When a casing collar such as the one designated 17 is encountered, locator 25 supplies a pulse to amplifier 27 and relay coil 40 is energized. This closes relay contacts 45 and 46 thereby energizing solenoid 47 and brake shoe 63 engages gear 62. Thus, the clutch comprised of shoe 63, gear 62 and planetary gears 55—57 completes a mechanical connection between driving means 53, 54 and carriage 58, and carriage extension 66 is carried from its quiescent position and along path 67. When the extension engages switch arm 68, a pulse is supplied to recorder 74 and relay coil 40 is de-energized thereby returning the system to its quiescent condition.

In order that a spurious recording of pulses may be avoided while the instrument 10 is being lowered, the coupling 51 may include a one-way clutch (not shown) for driving connection with pulley 52 when turning wheel 53 in the direction of the arrow and a slip connection when turning in the opposite direction. Where pulses derived from instrument 10 require an opposite depth correction, the one-way clutch may be reversed. Means other than a slip connection may of course be provided for rendering the memorizing system non-responsive to travel of instrument 10 in the direction for which a depth correction is not required. Thus, a selsyn repeater (not shown) may serve in lieu of coupling 51 and may be de-energized when instrument 10 is, for example, being lowered.

From the foregoing discussion, it is evident that a memorizing system constructed in accordance with the present invention is simple to construct and yet is entirely reliable and efficient in operation. In addition, at the end of a memorizing cycle determined by the engagement of member 66 with switch arm 68, relay 40 is promptly de-energized, as is solenoid 47, so that spring 65 can release shoe 63 quickly and thus spring 61 speedily returns carriage 58 to its quiescent position. Consequently, the reset time between the end of a memorizing cycle and the beginning of a new cycle is relatively short. Moreover, since switch 68, 69, 71 may be fixed in a given position, the system requires no moving electrical connections.

While a particular embodiment of the present invention has been shown and described, it is apparent that changes and modifications may be made without departing from this invention in its broader aspects, and therefore the aim in the appended claims is to cover all such changes and modifications as fall within the true spirit and scope of this invention.

I claim:

1. A system for deriving an output signal delayed from a pulse representing the occurrence of an event at a given depth of an instrument movable by suitable suspension means through a bore drilled into the earth comprising: a member movable from a quiescent position along a given path; driving means adapted to be coupled to the suspension means for moving said member along said path in proportion to movement of the instrument through the borehole; a clutch for completing a mechanical connection between said member and said driving means in response to a pulse from the instrument; means disposed at a selected point along said path for developing an electrical pulse upon engagement by said member; and utilization means responsive to said last-mentioned electrical pulse.

2. A system for deriving an output signal delayed from a pulse representing the occurrence of an event at a given depth of an instrument movable by suitable suspension means through a bore hole drilled into the earth comprising: a member movable from a quiescent position along a given path; driving means adapted to be coupled to the suspension means for moving said member along said path in proportion to movement of the instrument through the borehole; an electrically-energized clutch for selectively completing a mechanical connection between said member and said driving means; a source of electrical energy; a relay for completing an electrical circuit between said source and said clutch in response to a pulse from the instrument; means disposed at a selected point along said path for developing an electrical pulse upon engagement by said member; and utilization means responsive to said last-mentioned electrical pulse.

3. A system for deriving an output signal delayed from a pulse representing the occurrence of an event at a given depth of an instrument movable by suitable suspension means through a bore drilled into the earth comprising: a member movable from a quiescent position along a given path; means biasing said member toward said quiescent position; driving means adapted to be coupled to the suspension means for moving said member along said path in opposition to said biasing means in proportion to movement of the instrument through the borehole; an electrically energized clutch for selectively completing a mechanical connection between said member and said driving means; a source of electrical energy; a holding relay for completing an electrical circuit between said source and said clutch in response to a pulse from the instrument; means disposed at a selected point along said path for developing an electrical pulse and for de-energizing said holding relay upon engagement by said member; and utilization means responsive to said last-mentioned electrical pulse.

4. A system for deriving an output signal delayed from a pulse representing the occurrence of an event at a given depth of an instrument movable by suitable suspension means through a bore hole drilled into the earth comprising: a shaft adapted to be coupled to the suspension means for rotation in proportion to movement of the instrument through the borehole; a carriage supported for rotation about the longitudinal axis of said shaft from a quiescent position; a pair of pinions mounted on said carriage for rotational movement about respective axes parallel to said longitudinal axis and in meshing engagement with one another; a first gear fixed to said shaft for rotation therewith and in meshing engagement with one of said pinions; a second gear supported for rotation relative to said shaft about said longitudinal axis and in meshing engagement with the other of said pinions; brake means for interrupting movement of said second gear thereby to complete a mechanical driving connection between said shaft and said carriage in response to a pulse from the instrument; means disposed at a selected point along the path of movement of said carriage for developing an electrical pulse upon engagement thereby; and utilization means responsive to said last-mentioned electrical pulse.

5. A system for deriving an output signal delayed from a pulse representing the occurrence of an event at a given depth of an instrument movable by suitable suspension means through a bore hole drilled into the earth comprising: a shaft adapted to be coupled to the suspension means for rotation in proportion to movement of the instrument through the borehole; a carriage supported for rotation about the longitudinal axis of said shaft from a quiescent position; a pair of pinions mounted on said carriage for rotational movement about respective axes parallel to said longitudinal axis and in meshing engagement with one another; a first gear fixed to said shaft for rotation therewith and in meshing engagement with one of said pinions; a second gear supported for rotation relative to said shaft about said longitudinal axis and in meshing engagement with the other of said pinions; a stop adjustably fixed along an annular path about said longitudinal axis; means for biasing said carriage into engagement with said stop; brake means for interrupting movement of said second gear to complete a mechanical driving connection between said shaft and said carriage in response to a pulse from the instrument thereby to effect displacement of said carriage away from said stop; means disposed at a selected point along the path of movement of said carriage for developing an electrical pulse upon engagement thereby and utilization means responsive to said last-mentioned electrical pulse.

6. A system for deriving an output signal delayed from a pulse representing the occurrence of an event at a given depth of an instrument movable by suitable suspension means through a bore hole drilled into the earth comprising: a member movable from a quiescent position along a given path; driving means adapted to be coupled to the suspension means for moving said member along said path in proportion to movement of the instrument through the borehole; a clutch for completing a mechanical connection between said member and said driving means in response to a pulse from the instrument; means disposed at a selected point along said path for developing an electrical pulse upon engagement by said member; a recorder having a recording medium adapted to be coupled to the suspension means for displacement in proportion to movement of the instrument through the borehole and having an electrical input circuit; and means for supplying said last-mentioned electrical pulse to said input circuit of said recorder.

7. A system for deriving an output signal delayed from a pulse representing the occurrence of an event at a given depth of an instrument movable by suitable suspension means through a bore hole drilled into the earth comprising: a member movable from a quiescent position along a given path; means biasing said member toward said quiescent position; an adjustably fixed stop adapted to be engaged by said member to maintain said member in a selected position in opposition to said biasing means; driving means adapted to be coupled to the suspension means for moving said member along said path in opposition to said biasing means in proportion to movement of the instrument through the bore hole; a clutch for completing a mechanical connection between said member and said driving means in response to a pulse from the instrument; means disposed at a selected point along said path for developing an electrical pulse upon engagement by said member; and utilization means responsive to said last-mentioned electrical pulse.

References Cited in the file of this patent

UNITED STATES PATENTS

| | | |
|---|---|---|
| 2,326,219 | Hayward | Aug. 10, 1943 |
| 2,414,467 | Hunt | Jan. 21, 1947 |
| 2,417,528 | Ten Cate et al. | Mar. 18, 1947 |
| 2,558,427 | Fagan | June 26, 1951 |
| 2,602,833 | Swift | July 8, 1952 |
| 2,802,201 | Casagrande | Aug. 6, 1957 |